United States Patent
Pollack et al.

(10) Patent No.: US 9,209,438 B2
(45) Date of Patent: Dec. 8, 2015

(54) HERMETICALLY-SEALED FEED-THROUGH DEVICE

(71) Applicant: Pollack Laboratories, Inc., Colmar, PA (US)

(72) Inventors: Michael J. Pollack, Lansdale, PA (US); Richard A. DiDomizio, Hatfield, PA (US); William P. Doucet, Royersford, PA (US)

(73) Assignee: Pollack Laboratories, Inc., Colmar, PA (US)

( * ) Notice: Subject to any disclaimer, the term of this patent is extended or adjusted under 35 U.S.C. 154(b) by 0 days.

(21) Appl. No.: 13/782,091

(22) Filed: Mar. 1, 2013

(65) Prior Publication Data

US 2013/0230750 A1    Sep. 5, 2013

Related U.S. Application Data

(60) Provisional application No. 61/605,494, filed on Mar. 1, 2012.

(51) Int. Cl.
| | |
|---|---|
| *H01M 2/20* | (2006.01) |
| *H01M 2/06* | (2006.01) |
| *H01R 13/52* | (2006.01) |
| *H01M 10/48* | (2006.01) |
| *H01M 2/04* | (2006.01) |
| *H01M 10/0525* | (2010.01) |

(52) U.S. Cl.
CPC ............. *H01M 2/06* (2013.01); *H01M 2/043* (2013.01); *H01M 2/0404* (2013.01); *H01M 10/486* (2013.01); *H01R 13/5202* (2013.01); *H01M 2/046* (2013.01); *H01M 10/0525* (2013.01); *H01R 13/521* (2013.01)

(58) Field of Classification Search
USPC ............................................... 429/62
See application file for complete search history.

(56) References Cited

U.S. PATENT DOCUMENTS

| | | | |
|---|---|---|---|
| 2,434,475 | A | 1/1948 | Sullivan |
| 2,738,693 | A | 3/1956 | Logan |
| 4,210,381 | A | 7/1980 | Borgstrom |
| 4,484,022 | A | 11/1984 | Eilentropp |
| 4,982,055 | A | 1/1991 | Pollack et al. |
| 5,253,321 | A | 10/1993 | Long et al. |
| 5,422,438 | A | 6/1995 | Lamome |
| 5,545,059 | A | 8/1996 | Nelson |
| 5,878,851 | A | 3/1999 | Carlson et al. |
| 6,351,593 | B1 | 2/2002 | Pollack et al. |
| 6,609,937 | B2 | 8/2003 | Haas, II et al. |

(Continued)

*Primary Examiner* — Jacob Marks
(74) *Attorney, Agent, or Firm* — Howson & Howson LLP

(57) ABSTRACT

A hermetically-sealed electrical feed-through device includes a conductor, an insulating sleeve, and an outer ferrule interconnected in a manner preventing relative rotation therebetween and/or includes a thermocouple in direct contact with the conductor for monitoring temperature. The conductor can have a body section extending along an axis and having an outer contour including flats or an outwardly-extending eccentrically-shaped lobe. The sleeve confronts and covers the body section of the conductor and accommodates and engages the outer contour at the flats or lobe to prevent rotation of the conductor relative to the sleeve, and the outer ferrule sandwiches the insulating sleeve between the outer ferrule and the outer contour of the conductor. The outer ferrule accommodates and engages the sleeve adjacent the outer contour of the conductor at the flats or lobe to prevent rotation of the insulator sleeve relative to the outer ferrule.

12 Claims, 6 Drawing Sheets

(56) References Cited

U.S. PATENT DOCUMENTS

| | | |
|---|---|---|
| 6,786,774 B2 | 9/2004 | Haas, II et al. |
| 8,053,107 B1 | 11/2011 | Skinlo |
| 2005/0118501 A1 | 6/2005 | Hashimoto et al. |
| 2005/0159041 A1 | 7/2005 | Holliday |
| 2005/0287434 A1 | 12/2005 | Kim et al. |
| 2009/0311584 A1* | 12/2009 | Yamazaki .................. 429/93 |
| 2009/0317718 A1* | 12/2009 | Imachi et al. .............. 429/212 |
| 2010/0233528 A1* | 9/2010 | Kim et al. ................. 429/178 |

* cited by examiner

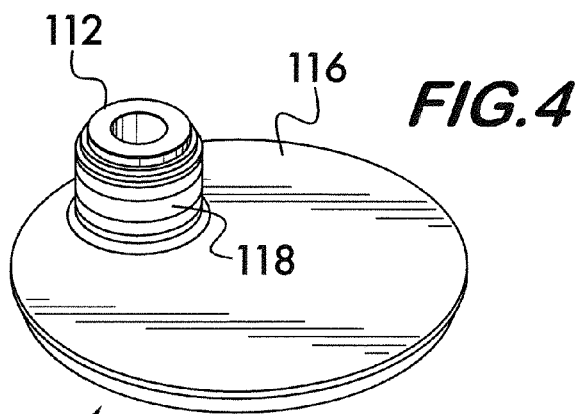
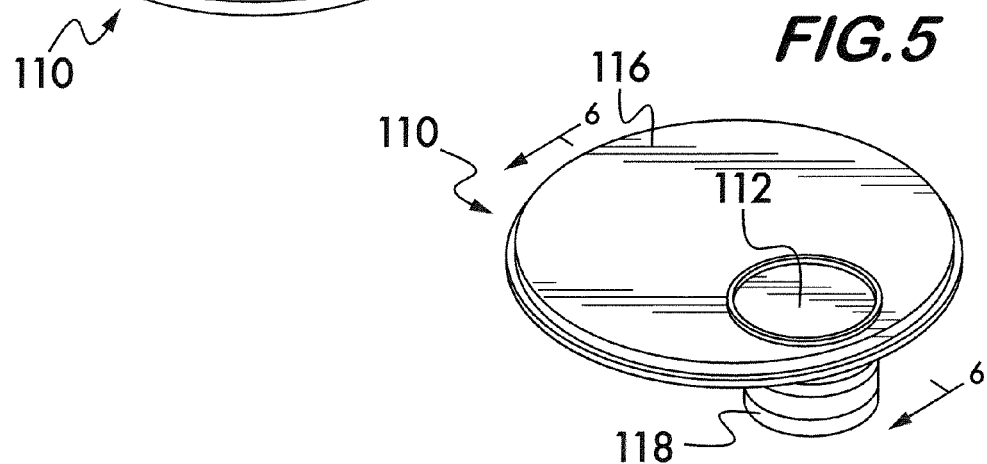
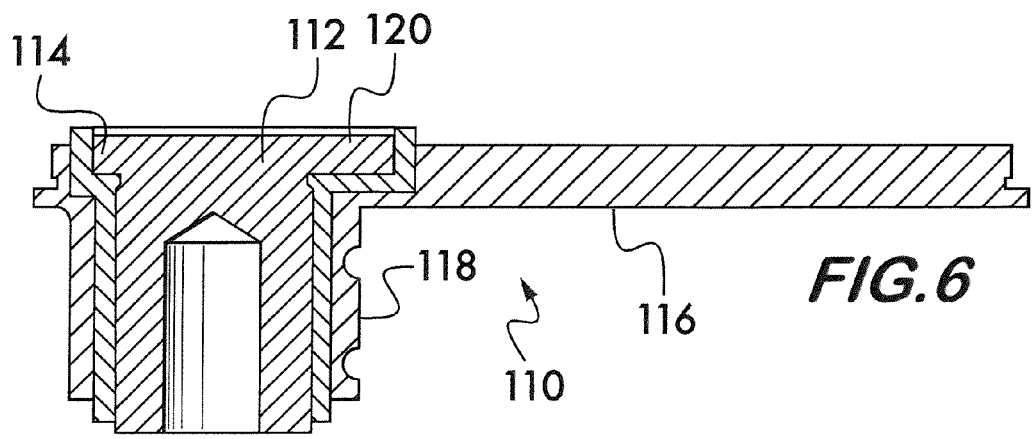

HERMETICALLY-SEALED FEED-THROUGH DEVICE

CROSS-REFERENCE TO RELATED APPLICATION

This application claims the benefit under 35 USC §119(e) of U.S. Provisional Patent Application No. 61/605,494, filed Mar. 1, 2012.

BACKGROUND

The present invention relates to feed-through devices used, for instance, in the assembly of an energy storage device or the like.

An electrical or optical feed-through device enables electrical or optical continuity from inside a sealed chamber or vessel through a wall of the chamber or vessel to a location external of the chamber or vessel. Typically, the feed-through device is required to withstand a harsh environment within the chamber or vessel without permitting the creation of leakage paths out of, or into, the sealed chamber or vessel.

An example of a feed-through device includes a terminal feed-through device for a lithium cell or battery or other electrochemical device which may contain corrosive electrolytes. Feed-through devices may also be used in chemical reactor vessels, heat treating atmospheres, vacuum furnace, environmental test chambers, controlled atmosphere furnaces and ovens, and the like.

BRIEF DESCRIPTION OF THE DRAWINGS

The foregoing features of the present invention should become apparent from the following description when taken in conjunction with the accompanying drawings, in which:

FIG. 4 is a perspective view of a second embodiment of an electrical feed-through device providing an anti-rotational feature according to the present invention;

FIG. 5 is a perspective view of the underside of the electrical feed-through device of FIG. 4;

FIG. 6 is a cross-sectional view along line 6-6 of FIG. 5;

DETAILED DESCRIPTION

A feed-through device can be used as a terminal lead for the positive or negative electrode of a high voltage lithium-ion cell. Feed-through devices typically include an elongate center ter terminal conductor with opposite ends to which welded connections or mechanical connections can be formed on opposite sides of a wall of a chamber, vessel, or the like that separates a harsh environment, such as the inside of a lithium ion cell, from an adjacent environment, such as an environment exterior the lithium-ion cell. A center section of the conductor must be encased within an insulator sleeve to electrically insulate the conductor from the adjacent wall of the battery or the like through which the feed-through device extends. An outer ferrule extends over the insulator sleeve to sandwich the insulator sleeve between the conductor and the outer ferrule. The purpose of the ferrule is to provide a hermetic seal about the center section of the conductor and prevent liquids, gases, or other environmental contaminants from passing along the length of the conductor between the engaging surfaces of the conductor and insulator, as well as between the engaging surfaces of the insulator and ferrule. The hermetic seal is provided by crimping the above referenced components together.

The exposed end of the conductor of the feed-through device which is located within a lithium-ion cell battery or the like is typically secured to an electrode. Thus, when the feed-through device is secured to the wall of the battery, the conductor must not be permitted to rotate about its central longitudinally-extending axis "A". If the conductor rotates, the electrical connection to the electrode will be broken or damaged within the sealed battery or lithium-ion cell and the relatively expensive battery or cell may be permanently damaged. Unwanted rotation of the conductor is typically caused via the use of too much torque when applying a jam nut or the like to the opposite end of the conductor located exterior of the battery. If too much torque is applied to tighten the exterior jam nut, the conductor may rotate within and relative to the cell interior and break the electrical connection within the battery.

Accordingly, embodiments of feed-through devices provided herein have an anti-rotational feature for purposes of preventing rotation of the conductor relative to the insulator sleeve, the ferrule, and the cell. The ferrule will be connected to the wall of the battery, such as by a weld or the like. Thus, provided the insulator sleeve cannot rotate within the ferrule and the conductor cannot rotate within the insulator sleeve, unwanted rotation of the conductor should be prevented.

Figure 1:
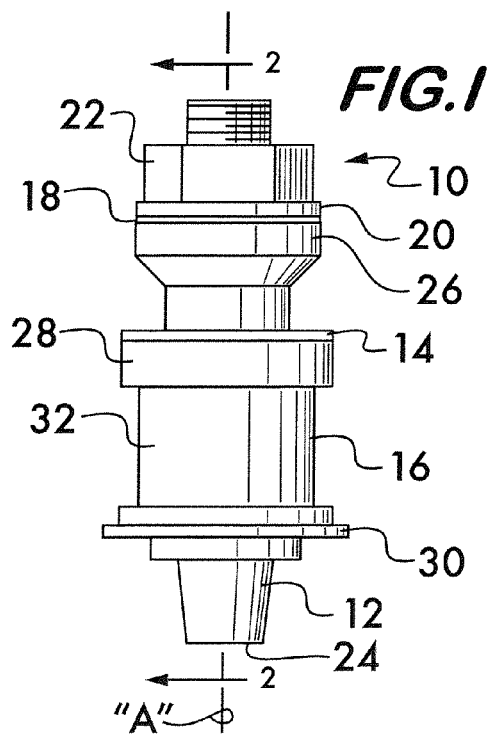
FIG. 1 is an elevational view of a first embodiment of an electrical feed-through device providing an anti-rotational feature according to the present invention.
Figure 3:
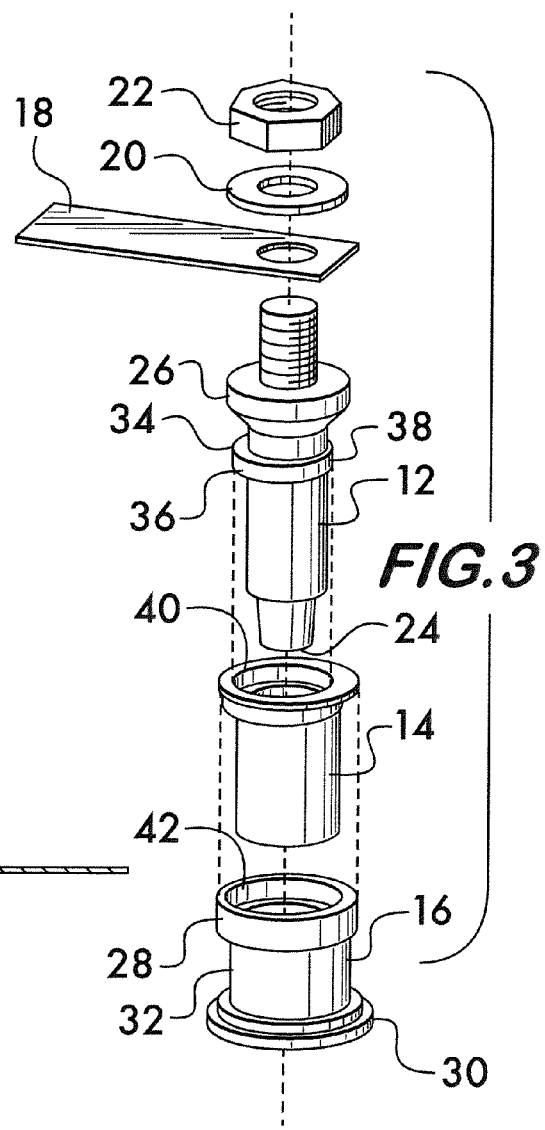
FIG. 3 is an exploded perspective view of the electrical feed-through device of FIG. 1.
Figure 2:
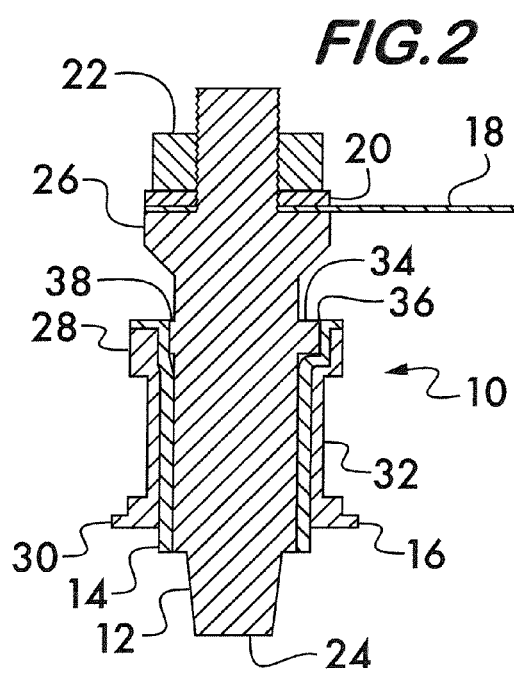
FIG. 2 is a cross-sectional view along line 2-2 of FIG. 1.
Figure 7:
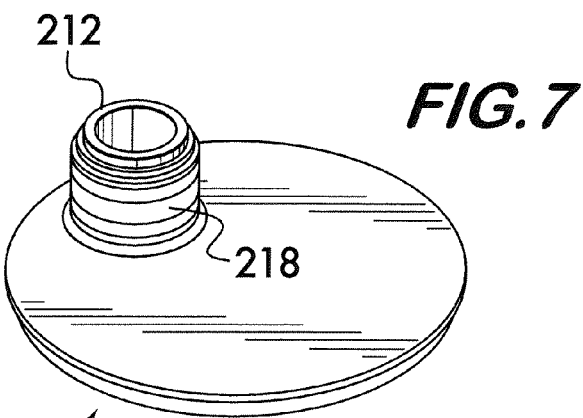
FIG. 7 is a perspective view of a third embodiment of an electrical feed-through device providing an anti-rotational feature according to the present invention.
Figure 8:
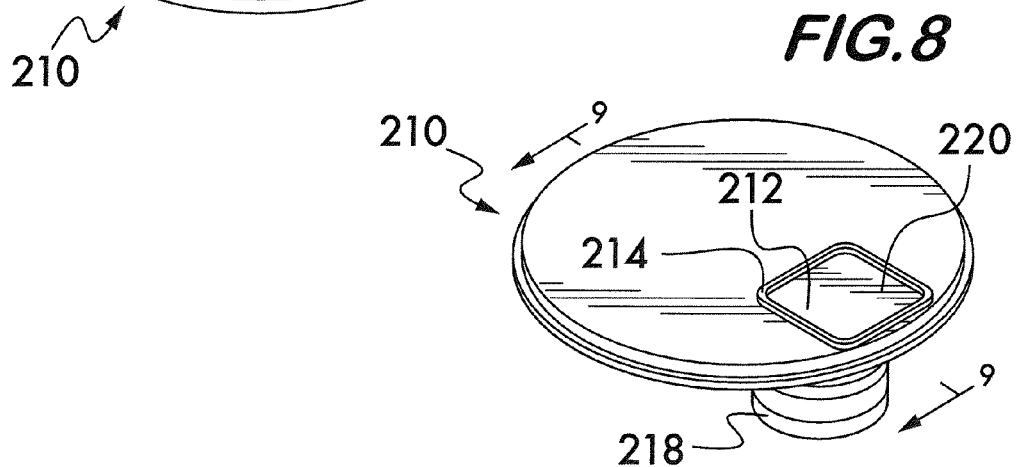
FIG. 8 is a perspective view of the underside of the electrical feed-through device of FIG. 7.
Figure 9:
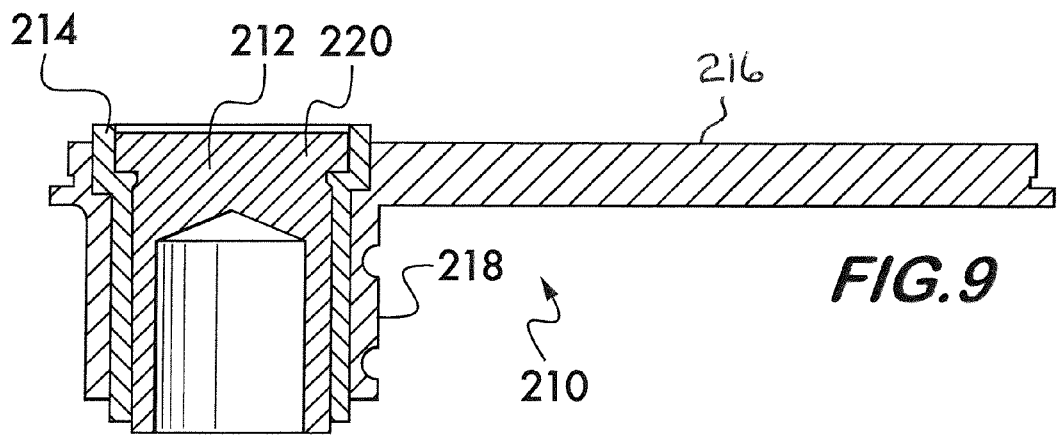
FIG. 9 is a cross-sectional view along line 9-9 of FIG. 8.
Figure 10:
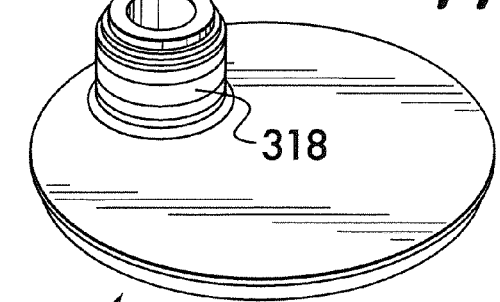
FIG. 10 is a perspective view of a fourth embodiment of an electrical feed-through device providing an anti-rotational feature according to the present invention.
Figure 11:
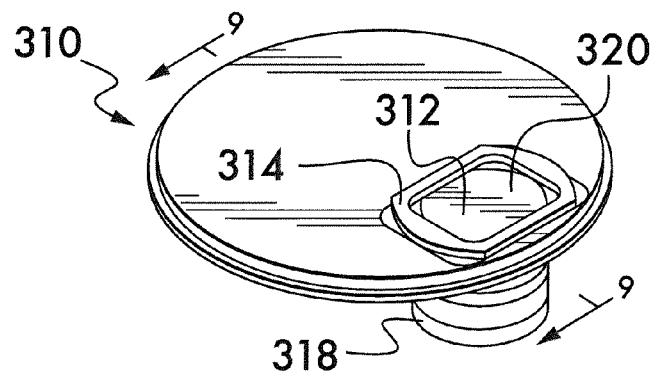
FIG. 11 is a perspective view of the underside of the electrical feed-through device of FIG. 10.
Figure 12:
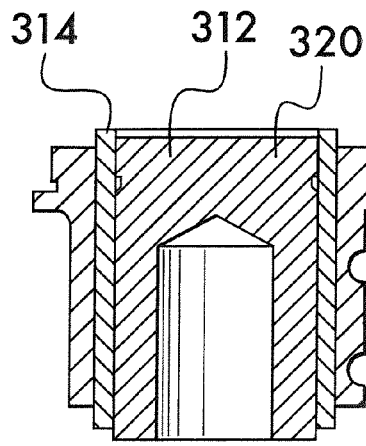
FIG. 12 is a cross-sectional view along line 9-9 of FIG. 11.

A first embodiment of an anti-rotation feed-through assembly 10 is shown in FIGS. 1-3. As shown in FIG. 1, the assembly 10 includes a conductor 12, a plastic insulator sleeve 14, a ferrule 16, a ribbon cable 18, a Belleville washer 20, and a nut 22. When assembled, as shown in FIGS. 1 and 2, a lower end 24 of the conductor 12 is exposed and can be electrically connected to an electrode or the like within a battery, and an electrical connection can be made to the upper exposed end 26 of the conductor such as via the ribbon cable 18. The nut 22 is used to secure the ribbon cable 18 to the conductor.

The assembly 10 is provided with means to prevent the conductor 12 from rotating relative to the insulator sleeve 14 and to prevent the insulator sleeve 14 from rotating relative to the ferrule 16. Thus, even if too much torque is applied to the nut 22, the conductor 12 should be prevented from any unwanted rotational movement about its longitudinal axis to permit any internal connections within the battery to remain unharmed.

As shown in FIGS. 1-3, the ferrule 16 has upper and lower flanges, 28 and 30 which extend outwardly or perpendicularly from the conductor 12. The indented region 32 of the ferrule 16 typically mates to and is secured to the wall of the battery. The insulator sleeve 14 extends within the ferrule 16 and isolates and separates any electrical connection between the conductor 12 and ferrule 16.

The conductor 12 includes an eccentric lobe 34 where upper flange 28 of the ferrule 16 is located. The eccentric lobe 34 is not centered relative to the central longitudinal axis of the conductor 12. For instance, a segment 36 of the lobe 34 extends further from the central longitudinal axis of the conductor 12 than an opposite segment 38. The eccentric lobe is received within an upper end 40 of the insulator sleeve 14 which fits tightly about the lobe 34. Thus, the conductor 12 cannot rotate by itself within the insulator sleeve 14 due to the engagement of the eccentric lobe 34 with the corresponding eccentric walls of the upper end 40 of the insulator sleeve 14. If the conductor rotates about its central longitudinal axis, the insulator sleeve will be forced to rotate therewith.

However, the eccentric upper end 40 of the insulator sleeve 14 is tightly received by an accommodating opening 42 formed in the upper flange 28 of the ferrule 16. Here, the adjacent walls of the ferrule 16 tightly engage about the upper end 40 of the insulater sleeve. Thus, due to the nature of the eccentric opening 42 of the ferrule 16, the upper end 40 of the insulator sleeve 14 cannot rotate relative to the ferrule. Accordingly, if the ferrule 16 is welded or otherwise tightly connected to the wall of a battery, the ferrule 16 cannot rotate, which in turn prevents the insulator sleeve 14 from rotating, which in turn prevents the conductor from rotating. Thus, an anti-rotational feature is provided by the eccentric lobe 34 of the conductor 12, the similarly shaped eccentric upper end 40 of the insulator sleeve 14 which tightly engages the lobe 34, and the similarly shaped eccentric opening of the ferrule which receives the lobe 34 and upper end 40 of the insulator sleeve.

It should be understood that any shape of lobe of the conductor and corresponding accommodating walls of the insulator body and ferrule can be used provided that respective rotation between these parts relative to the central longitudinal axis of the conductor is prevented. For instance, the lobe can have a square shape, a rectangular shape, an oval shape or any other shape that prevents rotation. Alternatively, as discussed above with respect to FIGS. 1-3, the lobe could simply be offset relative to the central longitudinal axis of the elongate conductor (i.e., an eccentric shape). A still further alternative is to provide flats on a conductor that are engaged by the insulator sleeve and ferrule to prevent rotation. In this alternative, instead of adding material to an otherwise substantially cylindrical portion of the conductor to form an outward extending lobe, one or more flats could be cut or formed into the conductor to form a conductor of a reduced amount of material and a smaller non-circular cross-section where the flats are cut or formed. Of course, other non-circular or offset lobes and flats could be provided.

In addition to the above assembly, FIGS. 4-12 show embodiments with feed-through devices having associated covers which can form part of the wall of a battery or the like or a cover that extends over part of a wall of a battery or the like. For example, FIGS. 4-6 illustrate an embodiment of a feed-through device 110 including a conductor 112, an insulator sleeve 114, and a cover 116 having an integrally-formed upstanding ferrule portion 118. Similar to the embodiment shown in FIGS. 1-3, the conductor includes an eccentric lobe 120 accommodated by similarly eccentric shaped recesses in the insulator body 114 and ferrule portion 118. Thus, the eccentric shapes of these components provide the same anti-rotation function provided by the embodiment illustrated in FIGS. 1-3 and discussed above in detail. The only significant difference is that lobe 120 is located adjacent an end of the conductor positioned within an interior of the battery instead of extending exteriorly of the battery.

The embodiments shown in FIGS. 7-9 and FIGS. 10-12 are similar to the embodiment shown in FIGS. 4-6, except the feed-through devices 210 and 310 include conductors 212 and 312 having a square and rectangular lobes 220 and 320, respectively, with similar shaped accommodating recesses in the insulator sleeves 214 and 314 and upstanding ferrule portions 218 and 318 of covers 216 and 316. Thus, these embodiments also provide an anti-rotational feature that prevents rotation of the conductor even in the event excessive torque is applied to a nut or the like applied to the exterior free end of the conductor.

Figure 13:
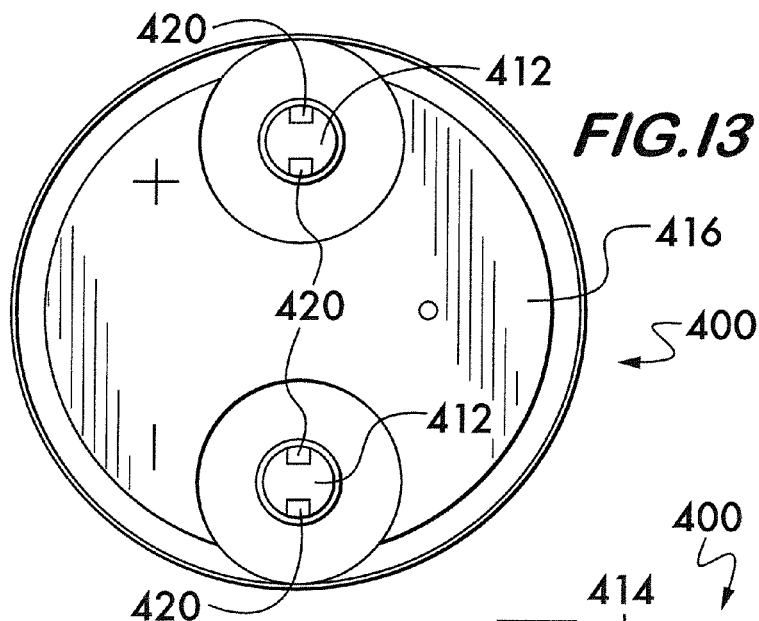
FIG. 13 is a plan view of a fifth embodiment of an electrical feed-through device providing an anti-rotational feature according to the present invention.
Figure 14:
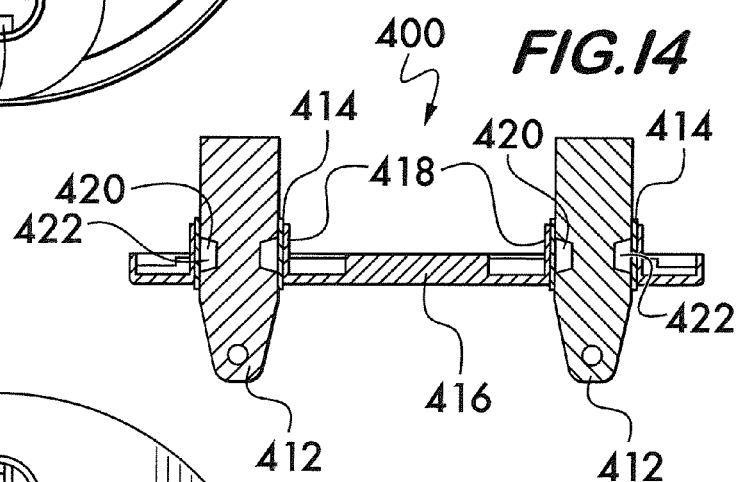
FIG. 14 is a cross-sectional view through the device of FIG. 13.
Figure 15:
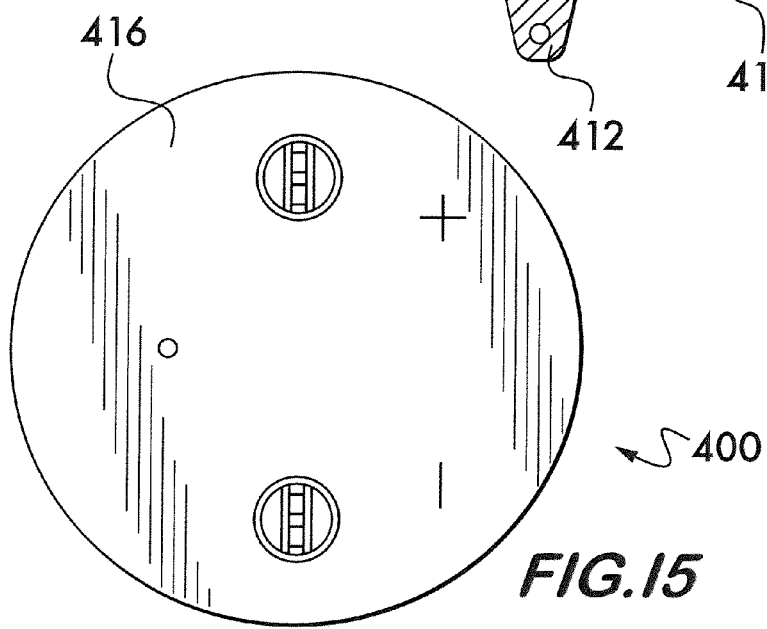
FIG. 15 is a bottom plan view of the device of FIG. 13.

An embodiment including a pair of feed-through devices is shown in FIGS. 13-15. The assembly 400 includes a cover 416 having spaced apart pair of upstanding ferrule portions 418, a pair of insulator sleeves 414, and a pair of conductors 412 (for instance, forming positive and negative terminals). In this embodiment, each of the conductors 412 includes an opposed pair of flats 420 where some of the material of the otherwise cylindrical conductors 412 has been removed to provide a non-circular outer periphery. The insulator sleeves 414 and ferrule portions 418 tightly confront the conductors 412 including along the flats 420 within the recesses 422 formed by the flats 420. For example, the insulator sleeves 414 and ferrule portions 418 can be crimped therein. Accordingly, rotation of the conductors 412 is prevented relative to the insulator sleeves 414 and ferrule portions 418 due to the flats 420 and corresponding portions of the insulator sleeves 414 and ferrule portions 418 confronting the flats 420 of the conductors 412.

Turning to another aspect of a feed-through device, particularly when used as a battery electrical terminal, an additional function relating to monitoring the conditions of the battery can be provided by the feed-through device. For example, the monitoring of the temperature of lithium-ion cells is an important indicator of potential problems with the cell. For instance, excessive temperature may lead to premature failure of the lithium-ion cell or significantly shorten the life of the cell. Accordingly, the earlier a temperature rise is observed, the earlier corrective actions can be taken to correct cell charging or discharging problems in a meaningful manner.

The conventional method for monitoring temperature of a lithium-ion cell is to use a thermocouple which is attached externally to a cell wall or battery stack case. Thus, as temperatures increase within the cell, the temperature will ultimately radiate to the exterior surface of the cell wall where it can be read and picked up by the thermocouple. However, the responsiveness to temperature changes provided by the externally located thermocouple is relative slow because the mass of the cell or stack forms part of the total mass involved with monitoring temperature change and it may take awhile before a temperature rise within the cell radiates and is transferred to an exterior surface of the cell.

Thus, an embodiment of a feed-through device can include a thermocouple or like component embedded within the electrical terminal conductor of the hermetically-sealed feed-through device. The purpose of the thermocouple is to provide an earliest possible warning of temperature change occurring within the sealed lithium-ion cell. The materials used as the conductors of the feed-through devices will inherently possess excellent thermal conductivity (for instance, copper, aluminum, titanium, molybdenum or the like). In addition, the conductor of a hermetically-sealed feed-through device is inherently thermally isolated from the rest of the surrounding components and environment by the insulator, such as the plastic insulator sleeves discussed above. Thus, the conductor of the feed-through device, which has an exposed end positioned within the interior of the lithium-ion cell, provides a direct thermal link to the interior of the lithium-ion cell. Thus, the conductor provides a means for improving responsiveness with respect to the monitoring of temperature change within the cell, and the thermocouple embedded therein can be used to provide an early indication of sudden temperature changes occurring within the cell.

In addition, the monitoring capability of the thermocouple embedded within the conductor can also be used in connection with an electronic switching device to switch off a cell during a potentially dangerous run-away lithium-ion cell situation. The thermocouple can be set to recognize such a situation and cause the electronic switching device to open or disconnect a circuit connection to the cell to save the cell and render an otherwise dangerous situation harmless. When current rises, the temperature of the conductor of the terminal feed-through device increases. Accordingly, when the current is beyond an acceptable predetermined limit and the embedded thermocouple recognizes a temperature increase associated with such a level, the electronic switching device which may be embedded in the terminal header or provided as an external separate unit can be used to open the circuit between the cell and an external electronic device to cut off the flow of current to the cell. Such an approach can be employed to permanently interrupt current flow from the cell to the external device or can automatically reset after an acceptable temperature is monitored by the embedded thermocouple for a preset period of time.

Figure 16:
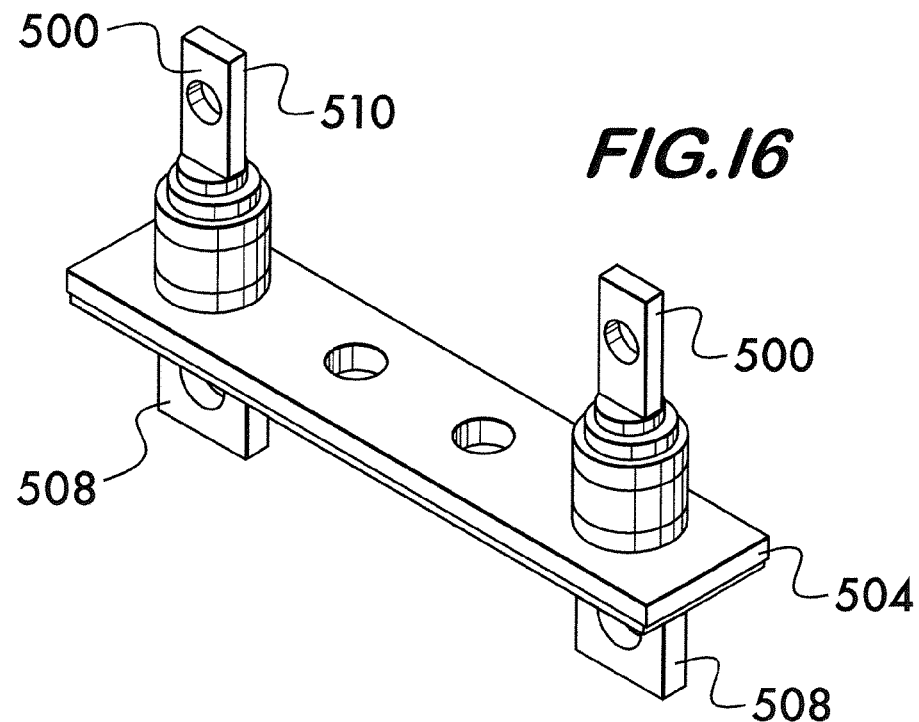
FIG. 16 is a perspective view of an embodiment of an electrical feed-through device cable of providing a temperature monitoring feature according to the present invention.
Figure 17:
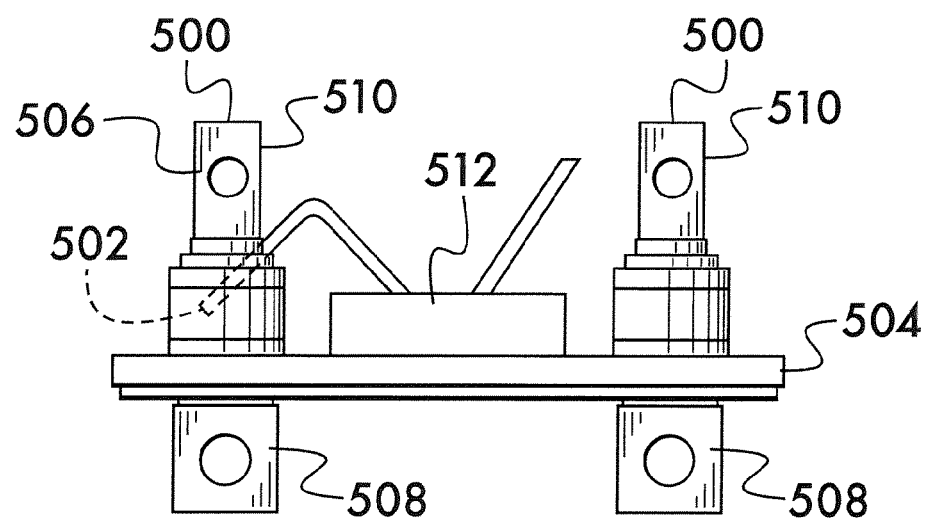
FIG. 17 is an elevational view of device of FIG. 16 with the addition of a thermocouple and switching device.

An embodiment of a feed-through device 500 including an embedded thermocouple 502 is shown in FIGS. 16 and 17. Here, a spaced-apart pair of hermetically-sealed feed-through devices 500 is connected to a header 504 for use as positive and negative terminals of a lithium-ion cell or like battery. The feed-through devices 500 can be in the form of any of the above described feed-through devices providing a conductor anti-rotation feature or can be of a conventional or other configuration. Each feed-through device 500 includes a conductor 506 having an exposed end 508 for being positioned within the interior of the cell or battery and an exposed end 510 located externally of the cell or battery. The mid-portion of the elongate conductor extends within an insulator sleeve and ferrule as discussed above and is otherwise electrically and thermally isolated from the walls of the cell or battery.

The thermocouple 502 is embedded within one of the conductors 506 and is electrically connected to an electronic switching device 512 mounted integrally on the header 504. The electronic switching device 512 is electrically connected to a means for opening the circuit between the cell and an electronic device connected to the cell. Thus, as discussed above, when temperature rises internally within the cell or due to a run-away current flow situation, the thermocouple 502 is able to quickly pick up the rise or change in temperature and cause the switching device 512 to take corrective measures when necessary.

Various alternative designs can be utilized. For example, the thermocouple need only be in contact with the conductor of the feed-through device and may not need to be fully embedded therein. Also, the positioning of the thermocouple can be altered such that it extends closer to the cell interior end of the conductor or closer to the cell exterior end of the conductor or midway therebetween. Still further, thermocouples can be used in both the positive and negative terminals and redundant thermocouples can also be included. Also, devices other than thermocouples for measuring temperature change or any other condition can be embedded into the conductor in the same manner discussed above for the thermocouple.

While anti-rotational and temperature monitoring feed-through devices and assemblies have been described in detail, various modifications, alterations, and changes may be made without departing from the spirit and scope of the present invention.

We claim:

1. A hermetically-sealed electrical feed-through device, comprising:
    a center conductor having a body section and opposite exposed ends extending along a longitudinally-extending axis of said conductor, said body section having an outer contour including flats or an outwardly-extending eccentrically-shaped lobe;
    an electrically-insulating sleeve confronting and covering said body section of said conductor and accommodating and engaging said outer contour at said flats or lobe to prevent rotation of said conductor about said longitudinally-extending axis relative to said insulating sleeve;
    an outer ferrule confronting and covering said insulating sleeve to sandwich said insulating sleeve between said outer ferrule and said outer contour of said conductor, said outer ferrule accommodating and engaging said insulating sleeve adjacent said outer contour of said body section of said conductor at said flats or lobe to prevent rotation of said insulator sleeve about said longitudinally-extending axis relative to said outer ferrule; and
    a thermocouple embedded within said center conductor.

2. A hermetically-sealed electrical feed-through device according to claim 1, wherein said outer contour of said body section includes flats that disrupt an otherwise circular outer diameter of said body section.

3. A hermetically-sealed electrical feed-through device according to claim 1, wherein said outer contour of said body section includes an outwardly-extending eccentrically-shaped lobe that has an oval outer periphery.

4. A hermetically-sealed electrical feed-through device according to claim 1, wherein said outer contour of said body section includes an outwardly-extending eccentrically-shaped lobe that has a non-circular outer periphery selected from the group consisting of a rectangular outer periphery, a square outer periphery, and a multi-sided outer periphery.

5. A hermetically-sealed electrical feed-through device according to claim 1, further comprising a cover which forms a portion of an outer wall of a lithium-ion cell battery, wherein said outer ferrule is integrally formed with said cover and projects therefrom, and wherein said cover has a circular outer periphery.

6. A hermetically-sealed electrical feed-through device according to claim 5, further comprising a switching device connected to said thermocouple for opening or closing a circuit including said conductor.

7. A hermetically-sealed electrical feed-through device comprising:

A center conductor having a body section and opposite ends extending along a longitudinally-extending axis of said conductor, said body section having an outer contour including an outwardly-extending eccentrically-shaped lobe that is offset and not centered relative to said longitudinally-extending axis of said conductor, said lobe having a circular outer periphery with a section of said lobe extending further from said longitudinally-extending axis of said conductor relative to an opposite section of said lobe;

an electrically-insulating sleeve confronting and covering said body section of said conductor and accommodating and engaging said outer contour at said lobe to prevent rotation of said conductor about said longitudinally-extending axis relative to said insulating sleeve;

an outer ferrule confronting and covering said insulating sleeve to sandwich said insulating sleeve between said outer ferrule and said outer contour of said conductor, said outer ferrule accommodating and engaging said insulating sleeve adjacent said contour of said body section of said conductor at said lobe to prevent rotation of said insulator sleeve about said longitudinally-extending axis relative to said outer ferrule; and a thermocouple embedded within said center conductor.

8. A battery having at least one hermetically-sealed electrical feed-through device, said at least one hermetically-sealed electrical feed-through device comprising:

a center conductor having a body section and opposite exposed ends extending along a longitudinally-extending axis of said conductor, said body section having an outer contour including flats or an outwardly-extending eccentrically-shaped lobe;

an electrically-insulating sleeve confronting and covering said body section of said conductor and accommodating and engaging said outer contour at said flats or lobe to prevent rotation of said conductor about said longitudinally-extending axis relative to said insulating sleeve;

an outer ferrule confronting and covering said insulating sleeve to sandwich said insulating sleeve between said outer ferrule and said outer contour of said conductor, said outer ferrule accommodating and engaging said insulating sleeve adjacent said outer contour of said body section of said conductor at said flats or lobe to prevent rotation of said insulator sleeve about said longitudinally-extending axis relative to said outer ferrule; and a thermocouple embedded within said center conductor;

wherein the battery is a lithium-ion cell battery; and wherein said conductor forms a terminal lead for a positive or negative electrode of the lithium-ion cell battery.

9. A battery according to claim 8, wherein said opposite exposed ends of said conductor include an end exterior of the battery and an end interior of the battery, and wherein said flats or lobe are located adjacent said end exterior of the battery.

10. A battery according to claim 8, further comprising a cover which has a circular outer periphery and forms a portion of an outer wall of the battery, wherein said outer ferrule is integrally formed with said cover and projects therefrom.

11. A battery according to claim 10, wherein said opposite exposed ends of said conductor include an end exterior of the battery and an end interior of the battery, and wherein said flats or lobe are located adjacent said end interior of the battery.

12. A battery according to claim 10, further comprising a switching device connected to said thermocouple for opening or closing a circuit including said conductor.

\* \* \* \* \*